June 23, 1925.
A. B. RHUDE
SPEAR PROJECTING TRAP
Filed July 15, 1924
1,543,030
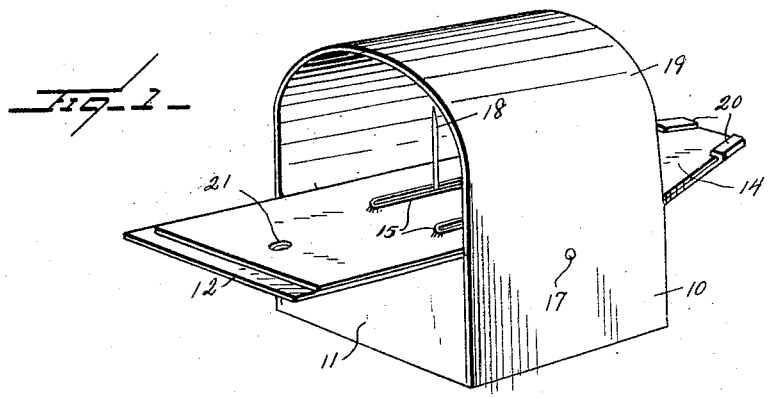
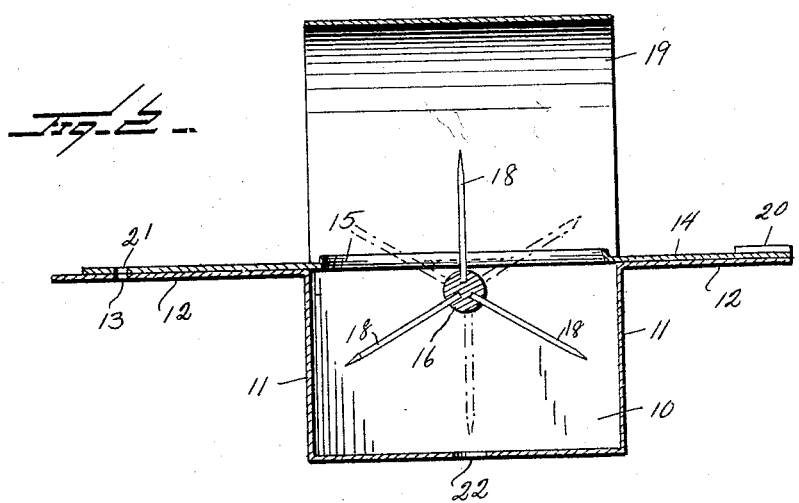
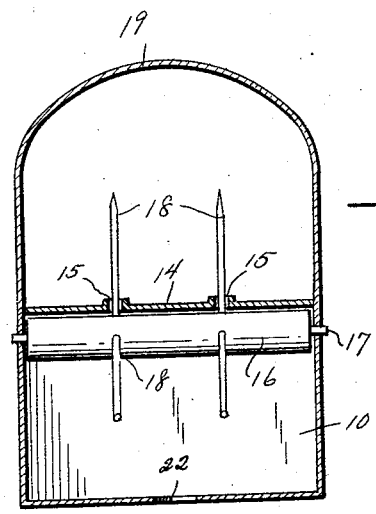
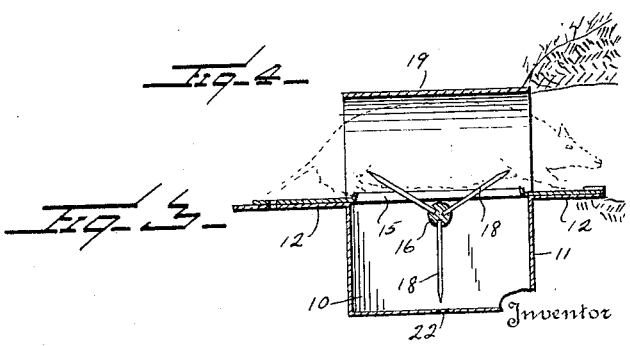
Inventor
A. B. Rhude
By Watson E. Coleman
Attorney Patented June 23, 1925.

1,543,030

UNITED STATES PATENT OFFICE.

ALONZO B. RHUDE, OF PLUMMER, IDAHO.

SPEAR-PROJECTING TRAP.

Application filed July 15, 1924. Serial No. 726,157.

*To all whom it may concern:*

Be it known that I, ALONZO B. RHUDE, a citizen of the United States, residing at Plummer, in the county of Benewah and State of Idaho, have invented certain new and useful Improvements in Spear-Projecting Traps, of which the following is a specification, reference being had to the accompanying drawings.

This invention relates to traps, and particularly to traps for catching rodents or other burrowing animals or animals that frequent runways. Traps of this character usually are disposed in the runway and are so arranged that the animals trip the trap as they pass through the runway.

My invention contemplates a trap having a rotatable knife carrier adapted to be disposed in the passageway or runway so that a plurality of spears or sharp-pointed members project up into the runway and are so arranged that as the gopher or other animal moves along the runway over the trap, the spears which have been heretofore projected upward may be turned down so another pair of spears will be automatically projected, and in this case will enter the animal attempting to pass the runway and, of course, kill him.

A further object is to provide a device of this character which will pierce an animal passing through the runway in either direction.

A still further object is to provide a device of this character which is adapted to be disposed either at the entrance of a burrow or in the runway leading thereto.

My invention is illustrated in the accompanying drawing, wherein:—

Figure 1 is a perspective view of a trap constructed in accordance with my invention;

Figure 2 is a vertical sectional view thereof;

Figure 3 is a transverse section;

Figure 4 is a longitudinal sectional view of the trap as shown in Figure 2 but illustrating the manner in which the animal is impaled as it attempts to pass through the trap, the animal being shown in dotted lines.

Referring to this drawing, 10 designates, generally speaking, the body of the trap which has a somewhat box-like form, the front and rear walls 11 of the box being angularly bent forward and rearward, as at 12, the extremities of these flanges or ears 12 being perforated, as at 13. Adapted to be disposed upon these flanges 12 and rest thereon and be held thereto in any suitable manner, as by bolts or other means passing through these perforations, is a platform 14 having a plurality of longitudinally extending slots 15.

Disposed between the side walls of the body 10 is a small shaft or roller 16 having trunnions 17 projecting through the side walls and this roller or shaft carries upon it a plurality of sets of radially extending pins 18, these sets being disposed so as to align with the slots 15 in the plate 14. These members 18 may be in the form of knives or merely may be sharp-pointed.

Arching over the body 10 above the platform is an arched cover 19, the extremities of which are arranged to engage the side walls and be held thereto against any accidental disengagement.

It will be noted from Figure 2 that one of the pins 18 always extends upward and the other two pins downward and as the gopher or other animal enters the hole or runway he strikes the upwardly projecting pin and turns it over, and inasmuch as the pins are spaced apart at their extremities a distance somewhat less than the length of the animal to be captured by the trap, the other pin turns up to the position shown in Figure 4 and pierces the animal beneath the stomach.

The trap is placed in the opening of the hole and is held there by a slab of rock or wood or it may be pinned down through the openings 21. If the gopher attempts to back out of the hole he will depress the vertically extending prong or spear 18 and two of the other spears will piece the gopher. If the gopher turns the spears to the position shown in Figure 4 and then attempts to back out, of course the forwardly projecting spear will pierce him. The object of the cover 19 is to protect the spears from falling dirt, trash, etc., and permit the proper rotation of the spears. I do not wish to be limited to any particular means of constructing this top, cover or hood 19.

It will be noted that the plate 14 at its forward end is reduced in width, as is one of the flanges 12, and that the flange 12 is formed with inturned lugs 20 so as to embrace the forward end of the plate 14. The plate 14 at its butt end is also formed with an aperture 21 which registers with the aperture 13 so that a small pin may be driven through this end of the two plates into the ground and lock the device in the runway. The bottom of the body 11 may be also provided with an aperture 22 for the same purpose.

I claim:—

1. A trap of the character described comprising a body adapted to be disposed in a runway and having a transversely extending shaft formed with radially projecting pointed members, the shaft being disposed approximately on a level with the runway, and a plate supported upon the body over said shaft and having slots through which the pointed members on the shaft project and through which they may turn.

2. A trap of the character described comprising a body adapted to be disposed within a runway and having upwardly and rearwardly extending portions, a shaft disposed within the body on a level slightly below that of the angular portions, the shaft having radially projecting pointed members, and a floor resting upon the angular portions, the floor being slotted to permit the projection of said pointed members.

3. A trap of the character described comprising a rectangular body, there being angular extensions at the upper edges of the end walls, a shaft rotatably mounted between the side walls and having a plurality of sets of radially extending pointed members, the pointed members of each set being disposed in the same plane, and a platform plate supported upon said angular extensions and having a plurality of slots, one for each set of pointed members.

4. A trap of the character described comprising a body having horizontal extensions from its forward and rear walls, a shaft mounted between the side walls of the body and having a plurality of sets of radially extending, sharp-pointed elements, the shaft being freely rotatable, a platform resting upon the angular extensions and having longitudinally extending slots through which the sets of elements project and move, and an arch-shaped top engaged at its ends with the side walls and arching over said body.

5. A trap of the character described comprising a body adapted to be disposed in a runway having a transversely extending shaft formed with a plurality of substantially radially projecting, pointed members, the pointed members being so mounted upon the shaft that one of the pointed members is always supported in a vertical position by gravity, and a plate supported upon the body over said shaft and having a slot through which the pointed members in the shaft may project and through which they may turn.

6. A trap of the character described comprising a body adapted to be disposed within a runway and having a box-like body, and a platform extending over the top of the body and slotted, a shaft mounted within the box-like body and having radially projecting pins adapted to be projected through said slots, the pins being so arranged upon the shaft that one of the pins is always held by gravity in a vertical position.

In testimony whereof I hereunto affix my signature.

ALONZO B. RHUDE.